Sept. 10, 1935.  J. I. MORRALL  2,014,285
ENLARGING CAMERA
Filed June 2, 1933  3 Sheets-Sheet 1

INVENTOR
James I. Morrall
BY
Russell B. Griffith
HIS ATTORNEY

Sept. 10, 1935.  J. I. MORRALL  2,014,285
ENLARGING CAMERA
Filed June 2, 1933  3 Sheets-Sheet 2
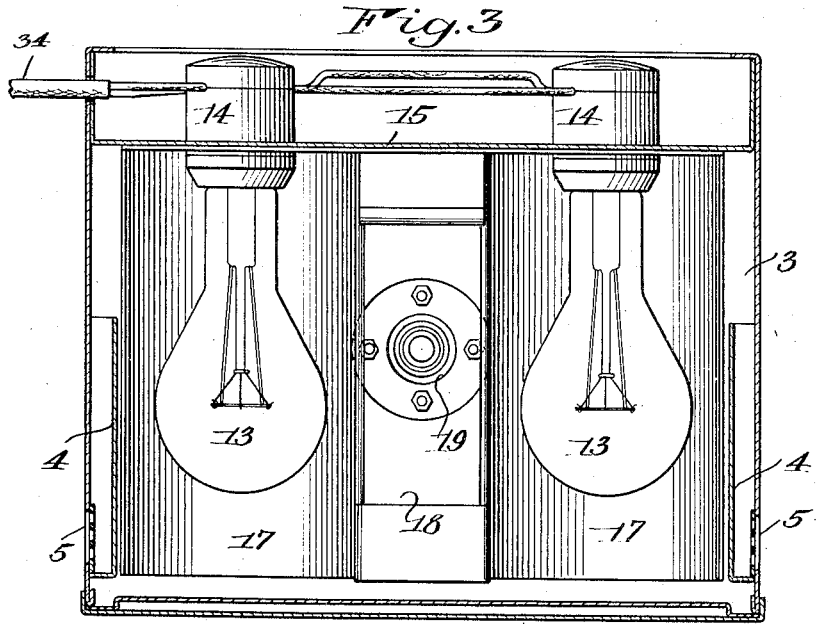
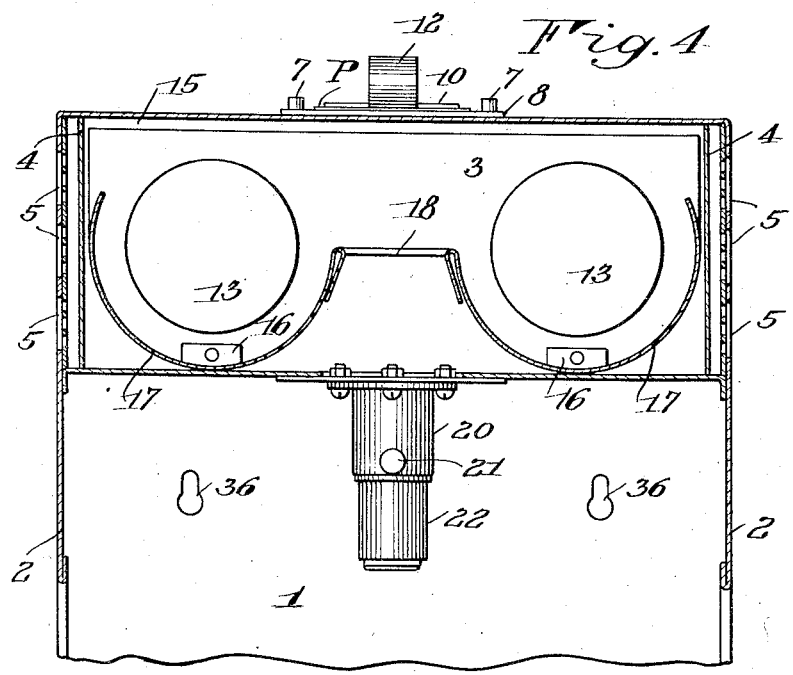
INVENTOR
James I. Morrall
BY
his ATTORNEY Sept. 10, 1935.　　　　　J. I. MORRALL　　　　　2,014,285
ENLARGING CAMERA
Filed June 2, 1933　　　　　3 Sheets-Sheet 3
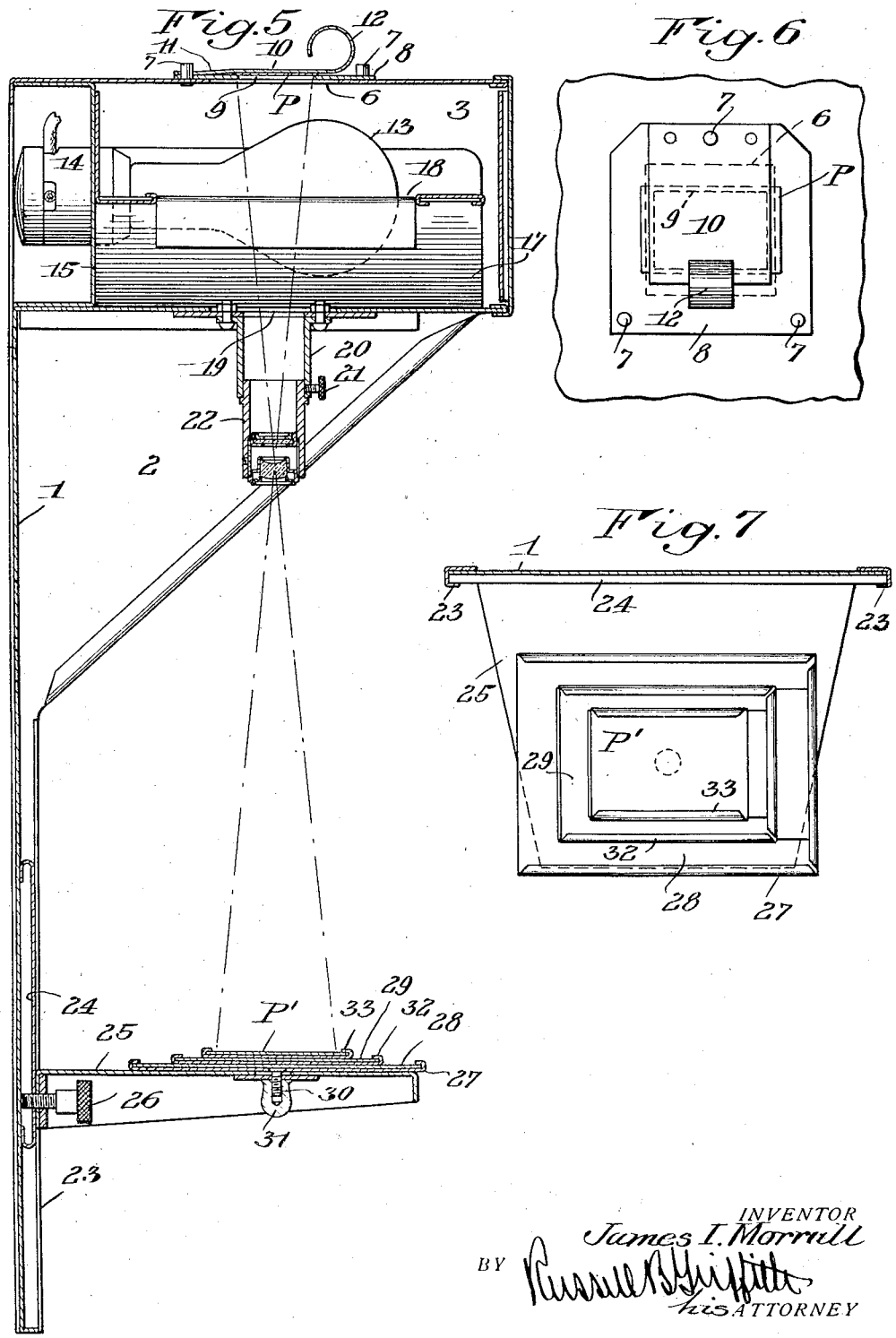
INVENTOR
James I. Morrall
BY Russell B. Griffith
his ATTORNEY Patented Sept. 10, 1935

2,014,285

UNITED STATES PATENT OFFICE 2,014,285

ENLARGING CAMERA

James I. Morrall, Rochester, N. Y., assignor to Quartermatic Photos, Inc., Rochester, N. Y., a corporation of New York Application June 2, 1933, Serial No. 674,052

3 Claims. (Cl. 88—24)

My present invention relates to photography and optics and more particularly to enlarging cameras and it has for its object to provide a simple, inexpensive and efficient camera of this character which may be manipulated by the user with ease and produced at a relatively low cost. The improvements are directed in part toward simplifying the structure so that exposures may be rapidly made in a dark room; toward eliminating the necessity of using a shutter, and toward the objective picture and sensitized sheet holders, together with the lighting effects for illuminating the former.

To these and other ends, the invention resides in certain improvements and combinations of parts, all as will be hereinafter more fully described, the novel features being pointed out in the claims at the end of this specification.

In the drawings:

Fig. 3 is an enlarged horizontal section through the illuminating compartment, taken substantially on the line 3—3 of Figs. 1 and 2;

Fig. 4 is a fragmentary view of the objective holding ends on the same scale, taken in vertical through the illuminating compartment on the line 4—4 of Fig. 2;

Fig. 5 is a vertical central section taken from front to rear in the plane of the optical axis;

Fig. 6 is a fragmentary view of the top of the lamp compartment showing a plan of the objective picture holder, and Fig. 7 is a horizontal section through the back bed showing a plan of the support and kit for holding the sensitized paper.

Similar reference numerals throughout the several views indicate the same parts.

Figure 1:
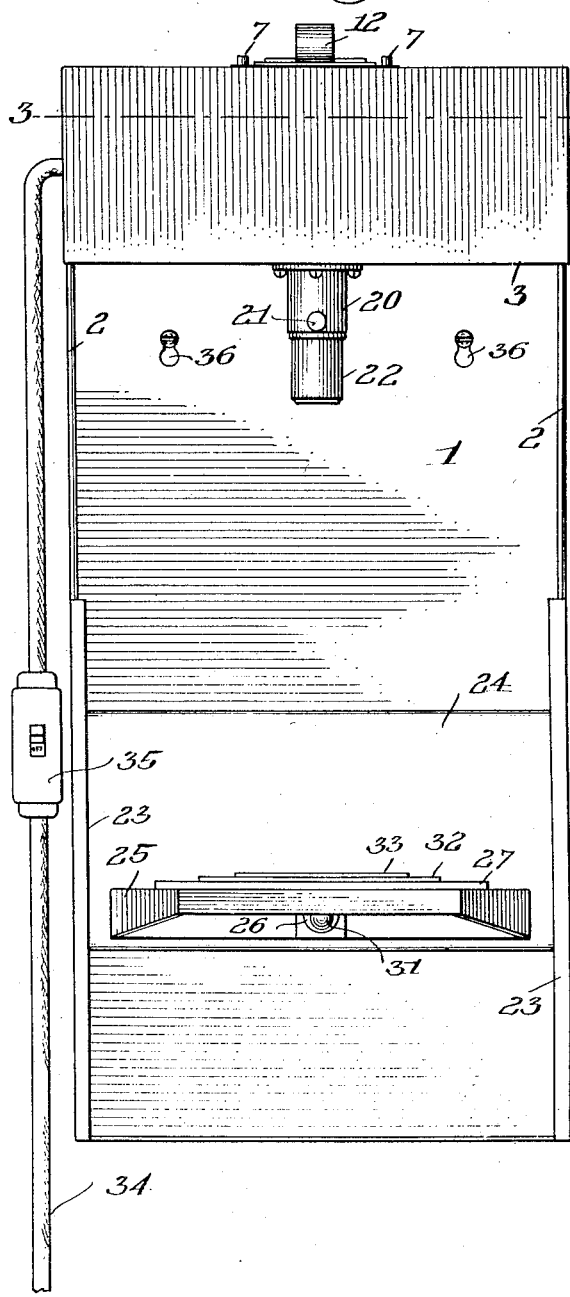
Fig. 1 is a front elevation or top plan view of an enlarging camera constructed in accordance with and illustrating one embodiment of my invention according to the position in which the apparatus is to be used, but for convenience I will call it a front view as the camera can be used to best advantage in a position in which its optical axis is vertically disposed.
Figure 2:
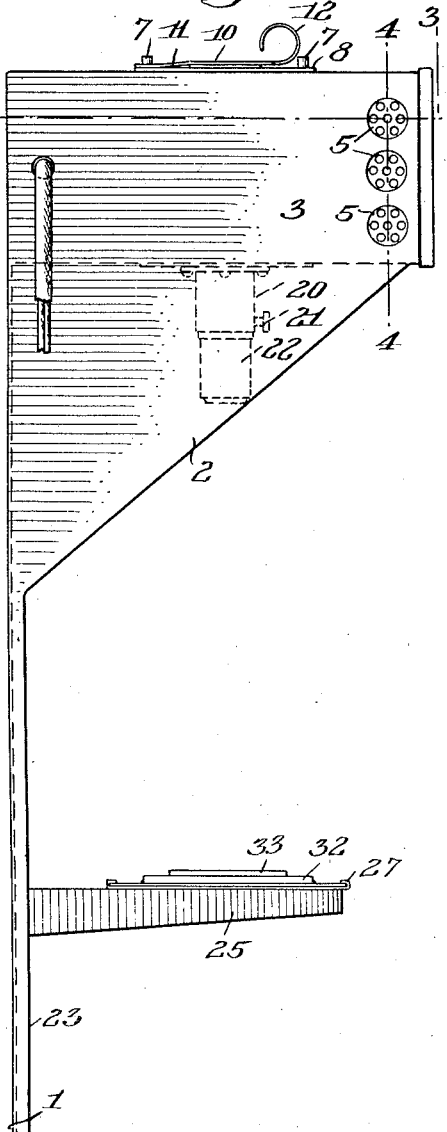
Fig. 2 is a side elevation thereof.

As before indicated, like most enlarging cameras, the illustrated embodiment of this invention may be used in a horizontal position with respect to its optical axis or in an upright position with its optical axis vertical, but it is primarily adapted for use in the latter position as will appear. The practical object is to provide an enlarging apparatus that may be set upon a shelf in a small dark room connected with or adjacent to small portable studios, such as are used to automatically or otherwise furnish a customer with a strip of small portraits at a charge of a few cents. Such studios are used at fairs and other public gatherings and the customer often wishes to, without waiting long, obtain an enlargement of a pose that particularly pleases him or her. Simple and rapid manipulation is, therefore, a consideration.

In this view and referring more particularly to the drawings, 1 indicates a rectangular, preferably sheet metal, backing that may be stood up with its lower edge upon a shelf and leaning against the wall. At its top, there is fixed thereto by a suitable means including side web brackets 2, a box constituting a lighting compartment 3 having partial double side walls 4 provided with ventilating gills 5. On the top wall of the box is a central, preferably rectangular, exposure opening 6 with several surrounding positioning pins 7. A holder for the objective picture to be enlarged is here provided and embodies an apertured plate freely detachable from and replaceable over the pins, such plate being indicated at 8, and a central opening therein at 9, which opening is thereby alined with the exposure opening 6 in the box. A spring tongue 10 secured to the plate at one end only, as indicated at 11, closes both apertures and by reason of its tension closely hugs the plate 8. At its opposite end it terminates in an eye or loop 12 constituting a finger hold whereby it may be raised to permit the picture that is to be enlarged to be slipped under it and then clamped thereby in position. This finger hold may also be used generally to manipulate the holder in its application to and removal from the box.

The pictures, enlarged reproduction of which is contemplated, are on coated printing paper and not translucent film negatives and hence they are illuminated by reflected rather than transmitted light. For this purpose, the box 3 contains a pair of electric lamps 13 mounted in suitable sockets 14 in a back partition 15, as best shown in Fig. 3. They extend horizontally forward and secured to the partition plate at 16 is a reflector comprising a pair of semi-cylindrical end portions 17 that partially surround the lamps from beneath and reflect their rays generally upwardly and inwardly toward the exposure opening 6 covered by the object, indicated at P in Figs. 5 and 6.

An intermediate connecting portion of the plate is provided with an opening 18 through which the light rays from the object picture reach a lens opening 19 in the bottom of the box compartment. This comprises a suitably attached collar 20, in which is held by a set screw 21 the tube 22 of the usual projecting lens system, shown in section in Fig. 5. Incidentally, this lens system or, rather, the tube by which it is carried may be turned end for end to make reductions instead of enlargements, if desired.

The back bed 1 is provided at its edges with flanges 23 constituting guides for a carriage plate 24 carrying a stage or easel 25 fixed thereto. This stage may be properly focused, as usual, by sliding the carriage along the guides, in which positions the stage is clamped by means of a thumb screw 26 extending through it and the carriage plate and reacting against the backing. A kit for retaining and positioning the sensitized sheets of paper that receive the enlarged image is carried on the stage. It consists of a plurality of superposed flanged plates 27, 28, and 29 adapted to slidably accommodate each other and which may be selectively detached to be replaced by a sheet of paper of any of the various sizes. The bottom plate 27 carries a threaded post 30 extending through a central opening in the stage and into a clamping knob or cap nut 31 on the underside, by means of which the kit is clamped to the stage and by loosening which the kit may be swung about on the post 30 as a center or removed entirely. The plates 28 and 29 have their flanged guides 32 and 33, respectively, supplied by the flanged edges of additional plates secured rigidly thereto. P' indicates a sheet of sensitized paper in the smallest or topmost holder.

As before stated, this is a dark room camera and no shutter is required. Instead, the line wire 34 to the lamps 13 is provided with a hand switch 35 and the current is thereby momentarily switched on and then off to energize the lamp for an adequate exposure.

Instead of standing the camera upright on a shelf or ledge, keyhole slots 36 are provided in the back bed 1 so that it may be supported upon spaced screw heads on the wall.

I claim as my invention:

1. In an enlarging camera, the combination with an illuminating compartment having a lens system and an exposure opening in the top thereof provided with surrounding centering pins, of an object holder comprising an apertured plate freely detachable from and replaceable over the pins and having a spring tongue attached to one side thereof only for clamping the object picture against the aperture, the free end of said tongue being provided with a finger hold for both springing the same to release the picture and for removing the plate from the exposure aperture.

2. In an enlarging camera, the combination with a flat backing provided with guides and adapted to fit in an upright position against a wall, of an illuminating compartment projecting forwardly from the top of said backing and having reenforcing connections with the backing, said compartment being provided with a lens system at the bottom and an exposure opening in the top thereof, an object holder on the exterior of the illuminating compartment cooperating with the exposure opening therein, illuminating means within the compartment, a shelf-like horizontal stage projecting forwardly from and slidable vertically in the guides of the backing, and a plurality of means on the stage for retaining in position sensitized photographic sheets of different sizes.

3. In an enlarging camera, the combination with an illuminating compartment having a lens system embodying a tube on the underside of the bottom thereof and an exposure opening in the top thereof provided with surrounding centering pins, of an apertured plate detachable from and replaceable over the pins for holding an object picture adjacent the opening, a pair of lamps within the compartment on opposite sides of the vertical plane of said lens system and a continuous sheet metal reflector plate for the lamps on the upper side of the compartment bottom comprising two semi-cylindrical portions partially surrounding them, respectively, from beneath and an intermediate connecting portion extending across the optical axis and provided with an aperture through which the light rays from the image reach the lens.

JAMES I. MORRALL.